Sept. 21, 1971  K. TSUNODA  3,606,802
VIBRATION-DAMPED ROTATABLE CYLINDRICAL MEMBER
Filed Aug. 5, 1969
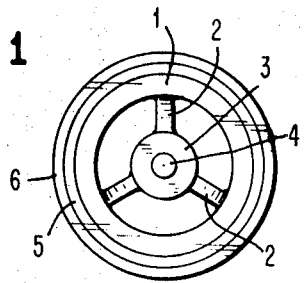
FIG. 1
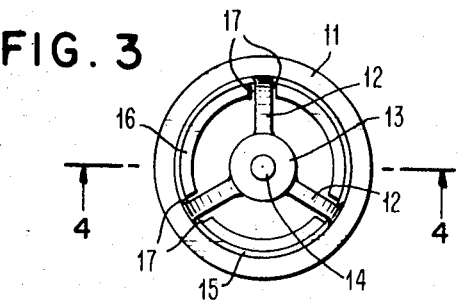
FIG. 3
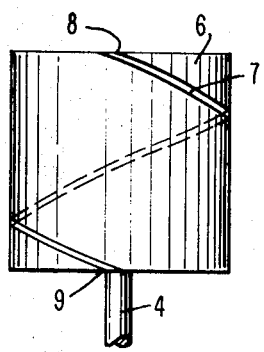
FIG. 2
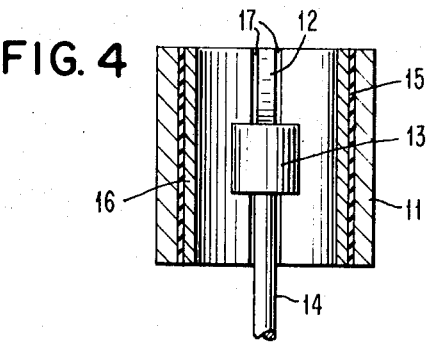
FIG. 4
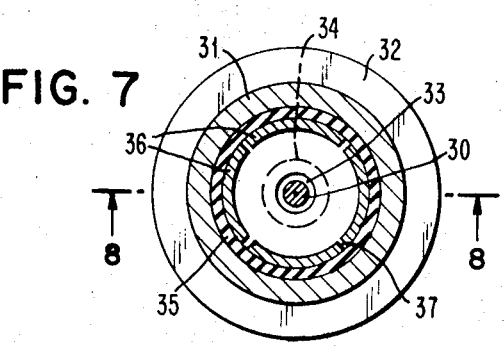
FIG. 7
FIG. 8
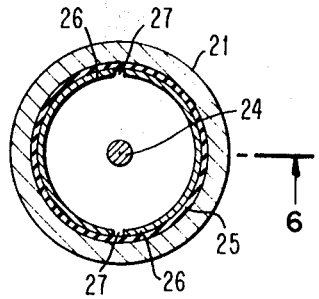
FIG. 5
FIG. 6
INVENTOR
KENNETH TSUNODA
BY Paul W. Garbo
AGENT 3,606,802
VIBRATION-DAMPED ROTATABLE
CYLINDRICAL MEMBER
Kenneth Tsunoda, 625D Closter Dock Road,
Closter, N.J. 07624
Filed Aug. 5, 1969, Ser. No. 847,683
Int. Cl. F16f 15/10
U.S. Cl. 74—574                                          12 Claims

ABSTRACT OF THE DISCLOSURE

The noise generated in driving pulleys and like rotatable cylindrical members by contact with a moving belt is appreciably diminished by coating one surface of the cylindrical member with a viscoelastic material and adhering a rigid material to the exposed surface of the viscoelastic material.

BACKGROUND OF THE INVENTION

This invention relates to a rotatable cylindrical member which is vibration-damped and acoustically deadened when driven by a moving belt.

Rotatable cylindrical members, such as pulleys, whorls and idlers, which are belt driven have long been a source of intense noise particularly when such members attain high rotational speeds.

Improvements in drive belts and surface treatments of pulleys and like rotatable members have failed to achieve satisfactory curtailment of the noise created by the operation of such members.

Accordingly, the object of this invention is to provide an improved structure for rotatable cylindrical members such as pulleys and idlers so that such members are vibration-damped and, therefore, acoustically deadened when driven at high rotational speed by contact with a moving belt.

SUMMARY OF THE INVENTION

In accordance with this invention, the vibration-damping of a rotatable cylindrical member is achieved by applying a layer of viscoelastic material to one surface of the cylindrical member and covering the viscoelastic layer with a discontinuous cylinder formed of a relatively rigid sheet.

The viscoelastic material may be any elastomeric material having high mechanical hysteresis or internal friction but low modulus of elasticity compared to the cylindrical member and the relatively rigid sheet between which the viscoelastic material is disposed. The efficiency of damping depends not only on the energy dissipation capacity of the viscoelastic layer but also on the proper coupling of the cylindrical member, the viscoelastic material and the relatively rigid sheet or constraining layer so that the vibrating energy of the cylindrical member is transferred to the viscoelastic layer and dissipated as heat. Amorphous polymers or copolymers, such as natural or synthetic rubber, polyvinyl chloride or alcohol, polypropylene, polyurethane and the like are suitable viscoelastic materials for the purpose of this invention. Glycol-diisocyanate copolymers are particularly desirable for use as the viscoelastic layer of the rotatable cylindrical member of this invention. Generally, it is advisable to make the thickness of the layer of viscoelastic material not more than about half of the thickness of the rotatable cylindrical member and not more than about the full thickness of the relatively rigid sheet between which the layer is sandwiched. Generally, the rigid sheet has a thickness less than that of the cylindrical body of the rotatable member; in many cases, the rigid sheet is preferably not more than about half as thick as the cylindrical body. It is often preferable to make the combined thickness of the rigid sheet and the viscoelastic layer not more than about the thickness of the cylindrical body.

The rotatable cylindrical member, such as a pulley, whorl or idler on a textile machine, is frequently made of ordinary steel. However, other metals including stainless steel, brass, bronze, aluminum, copper and various alloys, or relatively rigid plastics are also used to make such cylindrical members.

The discontinuous cylinder formed of a relatively rigid sheet may be made of the same metal of the rotatable cylindrical member or of a different metal. The relatively rigid sheet or constraining layer may also be made of materials other than metals. Suitable rigid materials include ceramic products or hard plastics.

The term discontinuous is used herein to connote that the cylinder attached to the layer of viscoelastic material applied on one surface of the rotatable cylindrical member has at least one interruption or gap extending the full length of the cylinder. This cylinder may advantageously have two, three or more lengthwise gaps by being formed of two, three or more equal cylindrical segments. In the case of a single gap in the cylinder, the gap is preferably a helix that starts and ends in a lengthwise line on the cylinder drawn parallel to its axis; in this way, the discontinuous cylinder is symmetrical and balanced relative to its axis. Otherwise, a single gap unbalances the cylinder and upsets the smooth operation of the rotatable cylindrical member at high rotational speed.

While the layer of viscoelastic material may be applied to either the inner or the outer surface of the rotatable cylindrical member, it is generally preferable to have the viscoelastic layer in contact with the inner surface so that the driving belt will contact the smooth, hard outer surface of the rotatable member.

For a fuller understanding of the invention, illustrative embodiments will now be described in detail in connection with the accompanying drawings.

BRIEF DESCRIPTION OF THE DRAWING

FIG. 1 is a top view of an idler with the viscoelastic material on the outer surface of the idler;

FIG. 2 is a front view of the idler of FIG. 1;

FIG. 3 is a top view of another idler with the viscoelastic material on the inner surface of the idler;

FIG. 4 is a section of the idler of FIG. 3 taken along the line 4—4;

FIG. 5 is a middle section of a cup-shaped idler taken normal to its axis;

FIG. 6 is a section of the idler of FIG. 5 taken along the line 6—6;

FIG. 7 is a middle section of a spool-type pulley taken normal to its axis; and

FIG. 8 is a section of the pulley of FIG. 7 taken along the line 8—8.

DESCRIPTION OF PREFERRED EMBODIMENTS

The idler of FIGS. 1 and 2 has cylindrical body 1 attached by three equally spaced radial webs 2 to hub 3 which is mounted on shaft 4. The outer surface of cylindrical body 1 is completely covered by an adherent layer 5 of viscoelastic material. Stiff strip 6 is helically wrapped around layer 5 with a small gap or clearance 7 between adjacent edges of strip 6. To avoid unbalancing of the idler, it will be noted that starting point 8 and terminating point 9 of helically wrapped strip 6 fall in a vertical line parallel to shaft 4. All the parts of the idler including strip 6 are metal; only layer 5 is a viscoelastic material such as glycol-diisocyanate copolymer.

The idler of FIGS. 3 and 4 has cylindrical body 11 attached by three equally spaced radial webs 12 to hub 13 which is mounted on shaft 14. The inner surface of cylindrical body 11 is coated with layer 15 of viscoelastic material. Three equal cylindrical segments 16 of a relatively stiff sheet are bonded to the exposed surface of layer 15. The longitudinal edges of each segment 16 are spaced by slight gaps 17 from the two webs 12 between which it is positioned so that segments 16 and webs 12 cannot come into rubbing contact when the idler is vibrated.

The cup-shaped idler of FIGS. 5 and 6 has cylindrical body 21 attached by disk 22 to hub 23 which is mounted on shaft 24. The inner surface of cylindrical body 21 as well as disk 22 is coated with layer 25 of viscoelastic material. Two equal cylindrical segments 26 of a relatively rigid sheet are bonded to layer 25 with a small gap 27 between the adjacent longitudinal edges of segments 26.

The spool-type pulley of FIGS. 7 and 8 comprises cylindrical body 31 and two flange plates 32, each of which has a central hole 33 and hub 34 attached to the outer face of flange plate 32. The inner surface of cylindrical body 31 is completely covered with layer 35 of viscoelastic material and four equal cylindrical segments 36 of a stiff sheet are embedded in layer 35 with a small gap 37 between each pair of adjacent longitudinal edges of segments 36. The opposite ends of each cylindrical segment 36 are also spaced by small gaps 38 from the opposed flange plates 32 so that segments 36 cannot contact flange plates 32 when the pulley is even severely vibrated. The outer faces of flange plates 32 are coated with a layer 39 of viscoelastic material and a discontinuous disk in the form of two semi-annular segments 40 of a fairly rigid sheet is bonded to each layer 39 with small gaps between the adjacent ends of each pair of semi-annular segments 40 and with a similar gap between each pair of semi-annular segments 40 and hub 34 around which they are positioned. Thus, the two semi-annular segments 40 on each of opposed flange plates 32 cannot rub with each other or with hub 34 around which they are disposed when the pulley is vibrated at high rotational speed. In lieu of two or more annular segments, the discontinuous disk may be a single element with a spiral slit or gap extending from its periphery to its center.

What is claimed is:

1. A vibration-damped rotatable cylindrical member comprising a cylindrical body mounted on a shaft, a layer of viscoelastic material adherent to one of the two sides of said cylindrical body, and a discontinuous cylinder formed of a relatively rigid sheet and having at least one gap extending the full length of said cylinder, said cylinder being supported in contact with substantially only said layer of viscoelastic material and said cylinder having a thickness less than that of said cylindrical body.

2. The vibration-damped rotatable cylindrical member of claim 1 wherein the layer of viscoelastic material has a thickness of not more than about half of the thickness of the cylindrical body.

3. The vibration-damped rotatable cylindrical member of claim 1 wherein the layer of viscoelastic material is adherent to the inner surface of the cylindrical body, and the discontinuous cylinder is provided by at least two equal cylindrical segments that are separated from each other by small gaps extending the full length of said cylindrical segments.

4. The vibration-damped rotatable cylindrical member of claim 3 wherein the cylindrical body and the discontinuous cylinder are made of metal, and the layer of viscoelastic material comprises a material selected from the group consisting of amorphous polymers and copolymers.

5. The vibration-damped rotatable cylindrical member of claim 3 wherein the cylindrical body is attached to a hub by at least one circular plate disposed normal to the shaft, a layer of viscoelastic material is adherent to one of the two sides of said plate, and a discontinuous disk of a relatively rigid sheet is in contact with said layer of viscoelastic material adherent to said plate.

6. The vibration-damped rotatable cylindrical member of claim 3 wherein the layer of viscoelastic material has a thickness not more than about the full thickness of said discontinuous cylinder.

7. The vibration-damped rotatable cylindrical member of claim 6 wherein the cylindrical body and the discontinuous cylinder are made of metal, and the layer of viscoelastic material comprises a material selected from the group consisting of amorphous polymers and copolymers.

8. The vibration-damped rotatable cylindrical member of claim 7 wherein the combined thickness of the discontinuous cylinder and the layer of viscoelastic material is not more than about the thickness of the cylindrical body.

9. The vibration-damped rotatable cylindrical member of claim 1 wherein the cylindrical body is provided with flange plates at its opposite ends, a layer of viscoelastic material is adherent to one of the two sides of each of said flange plates, and a discontinuous disk of a relatively rigid sheet is in contact with said layer of viscoelastic material adherent to each of said flange plates.

10. The vibration-damped rotatable cylindrical member of claim 9 wherein the layer of viscoelastic material comprises a material selected from the group consisting of amorphous polymers and copolymers and is disposed on the inner surface of the cylindrical body and on the outer side of each flange plate.

11. The vibration-damped rotatable cylindrical member of claim 5 wherein the cylindrical body, the discontinuous cylinder, the circular plate and the discontinuous disk are made of metal.

12. The vibration-damped rotatable cylindrical member of claim 9 wherein the layer of viscoelastic material is adherent to the inner surface of the cylindrical body, and the discontinuous cylinder is provided by at least two equal cylindrical segments that are separated from each other by small gaps extending the full length of said cylindrical segments.

References Cited

UNITED STATES PATENTS

| | | | |
|---|---|---|---|
| 2,673,470 | 3/1954 | Cosmos | 74—230.7 |
| 2,722,138 | 11/1955 | Neher | 74—574 |
| 3,222,953 | 12/1965 | Benjamen | 74—574 |
| 3,318,165 | 5/1967 | McAleer et al. | 74—230.7 |
| 3,068,007 | 12/1962 | Satchell | 117—94 |
| 3,408,770 | 11/1968 | Smolinski et al. | 117—94 |
| 3,434,869 | 3/1969 | Davidson | 117—94 |

WILLIAM F. O'DEA, Primary Examiner

W. S. RATLIFF, JR., Assistant Examiner

U.S. Cl. X.R.

117—94